United States Patent [19]

Fujita et al.

[11] E Patent Number: Re. 33,782

[45] Reissued Date of Patent: Dec. 31, 1991

[54] VALVE

[75] Inventors: Yuichi Fujita, Ichikawa; Takayuki Kaneko, Yachiyo; Mitsuo Okada, Tokyo; Kazumi Shima, Sakura; Hideaki Yanaru; Tohru Numaguchi, both of Chiba, all of Japan

[73] Assignee: Toyo Engineering Corporation, Tokyo, Japan

[21] Appl. No.: 513,437

[22] Filed: Apr. 23, 1990

Related U.S. Patent Documents

Reissue of:

[64] Patent No.: 4,789,132
Issued: Dec. 6, 1988
Appl. No.: 83,574
Filed: Aug. 7, 1987

[30] Foreign Application Priority Data

Aug. 14, 1986 [JP] Japan ..... 61-190796

[51] Int. Cl.[5] ..... F16K 31/04; F16K 1/02; F16K 1/48

[52] U.S. Cl. ..... 251/129.11; 251/122; 137/219

[58] Field of Search ..... 251/129.11, 122; 137/219

[56] References Cited

U.S. PATENT DOCUMENTS 4,452,423 6/1984 Beblavi et al. ..... 251/129.11 X
4,463,930 8/1984 Vamvakas .
4,685,434 8/1987 Ando et al. ..... 251/129.11 X

*Primary Examiner*—Arnold Rosenthal
*Attorney, Agent, or Firm*—Flynn, Thiel, Boutell & Tanis

[57] ABSTRACT

A valve including rotor means of which position is rotatably fixed within tubular flowpassage means; rotating magnetic field generating means fixedly positioned around said rotor means; first screw means which are rotated coaxially with the rotor means together with the latter; second screw means which engage the first screw means and are movable in an axial direction of the screw without being rotated for itself by the rotation of the first screw means; valve body means connected to the second screw means; and valve seat means in engagement with the valve body means, whereby the rotor means are rotated by the action of the rotating magnetic field generated by the rotating magnetic field generating means, said rotation causes the second screw means to be moved in an axial direction of the screw, and said movement is transmitted to the valve body to adjust a degree of opening and closing of the valve.

11 Claims, 4 Drawing Sheets

VALVE

Matter enclosed in heavy brackets [ ] appears in the original patent but forms no part of this reissue specification; matter printed in italics indicates the additions made by reissue.

FIELD OF THE INVENTION

This invention relates to a valve. More specifically, the present invention relates to a valve in which a valve body is operated by a turning force produced by means of an electromagnetic force, and relates to a valve in which a valve body is not mechanically operated by an external source via a sliding seal portion provided therein, such as a gland packing and mechanical seal.

OBJECT OF THE INVENTION

It is an object of this invention to provide a valve in which little or no structure exists outside the tubular passage or pipeline or if such structure exists, it is designed as small as possible, and a valve in which a valve body is powerfully operated utilizing a screw mechanism.

The actuator for a valve requires a considerable space in a piping system assembly.

In the case where the equipment and piping systems need to be assembled as compactly as possible, the space occupied by the actuator for the valve is desired to be reduced as small as possible.

Not only opening and closing a flow passage, but also, an accurate flow-rate adjusting function is required for the valve. This invention well meets this requirement.

EXPLANATION OF THE INVENTION

The present invention has been achieved as a result of the earnest studies made by the inventors in order to achieve the aforesaid object. More specifically, the present invention provides a valve including rotor means of which positon is rotatably fixed within tubular flow passage means; rotating magnetic field generating means fixedly positioned around said rotor means; first screw means which are rotated coaxially with the rotor means together with the latter; second screw means which engage the first screw means and are movable in axial direction of the screw without being rotated itself by the rotation of the first screw means; valve body means connected to the second screw means; and valve seat means for engagement with the valve body means, whereby the rotor means are rotated by the action of the rotating magnetic field generated by the rotating magnetic field generating means, said rotation causes the second screw means to be moved in an axial direction of the screw, and said movement is transmitted to the valve body to adjust the degree of opening and closing of the valve.

Figure 1:
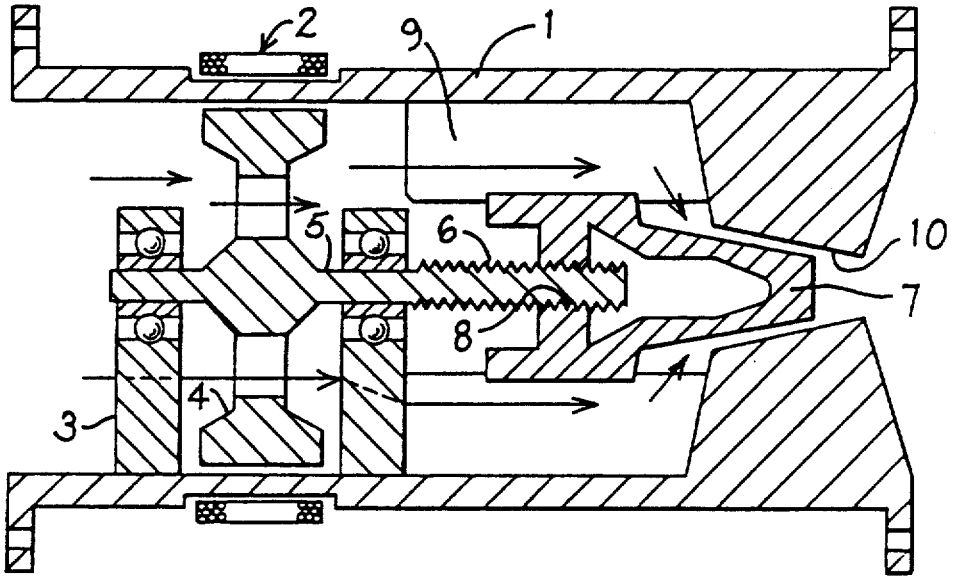
FIGS. 1 to 6 respectively show a longitudinal sectional view of embodiments of valves according to this invention.

The tubular flow passage of the valve according to the present invention may have an outside diameter which is the same as that of the tubular passage to be connected as if the external appearance thereof is a part of the tubular passage of a piping system, or it has an outside diameter slightly larger than that of the tubular passage, or is freely selected to be smaller than the outside diameter or slightly larger than that of the tubular passage.

One or more rotors or electric motors by which the valve body is actuated to control the degree of opening of the valve are installed in the tubular flow passage. If a plurality of such rotors or motors are provided, they are normally coaxially provided.

The rotor is located in the tubular flow passage resulting in that the rotor itself obstructs the flow of fluid. In order to minimize the aforesaid obstruction, the rotor is provided with fluid-passing portions as large as possible and as many as possible to allow the fluid to pass through.

Likewise, also in the case where the motor is fixed in the tubular flow passage, it is naturally necessary to make larger the cross-sectional projected area through which the fluid passes, by selecting a motor which allows to make smaller the cross sectional projected area of both of the motor and a fixing element to fix the motor in the tubular flow passage which area obstructs the flow of the fluid.

Considering the cases in which the rotor is rotating and is at rest, the fluid passing portion provided in the rotor, i.e. a cutout hole or the like which allows the fluid to pass through it, may be normally designed so as to allow the fluid to pass through the portion in the same direction as the fluid flow through the tubular passage of the valve, or it may be designed so as to allow the fluid to pass through the portion in a direction inclined with respect to the the direction of the fluid flow through the tubular passage of the valve as required.

The shape of the cross-sectional area of the fluid passing portion is naturally selected taking into consideration the mechanical strength of the rotor.

In the gap between the outer periphery of the rotor and the inner wall surface of the tubular flow passage, a longitudinal slot portion may be provided on the outer periphery of the rotor or on the inner wall surface of the tubular flow passage to reduce the flow resistance of the fluid at a portion where the rotor is installed. This means for reducing the flow resistance may be used also for the aforesaid fluid passing portion.

Rotors of any desired number, of such as one or more, are secured to one and the same rotational shaft, and likewise, for the motor, the desired number of rotors and stators are juxtaposed, to produce the turning force as required.

A combination of a rotor and rotating magnetic field generating means or an electric motor, both of which constitute a pulse motor, or A.C. servo motor constitutes a preferred valve body driving power source.

A combination of a rotor and a rotating magnetic field generating means, and an electric motor may be hereinafter collectively called "a motor assembly in the present invention".

A rotational shaft of a rotor or a motor may have a mechanical or electric brake system attached thereto to stop the rotation thereof as needed.

A rotational shaft of a rotor or a motor and a valve function composed of a valve body and a valve seat may be positioned in the center of the tubular flow-passage or may be positioned eccentrically.

Where a rotor is used for a large-size valve, the angle of a rotational shaft having the first screw means with respect to the direction of flow of the fluid is selected according to the position of the rotating magnetic field generating source or rotating magnetic field generating means for driving the rotor, and to the direction changing mechanism adopted for the fluid. Similarly, the direction of the rotational shaft having first screw means of the motor can be inclined at a suitable angle with respect to the direction of flow of the fluid.

The rotor or motor may be positioned at the upstream, downstream or both sides with respect to a valve body and a valve seat of a valve according to this invention.

In the case where the rotor or motor is positioned at both sides, the upstream and downstream rotors or the like work together to actuate the valve body.

To locate the rotor in the tubular flow passage of the fluid, more than one fixing element for the rotor hearing means are provided on the inner wall of the tubular flow passage. These may be roller bearings or sliding bearings.

On the other hand, as another rotor bearing means, in the case where the tubular flow passage is small in diameter or where as desired, more than one bearing track for bearing the outer periphery of the rotor to allow the rotor to rotate are provided on the inner wall surface of the tubular flow passage. For the contact between the outer periphery of the rotor and the bearing track, the roller bearing may be employed; and where the surface of the bearing track or the like is covered with a high polymer material which can have a surface having a low coefficient of friction, or where the fluid passing through the valve has a lubricating ability, the sliding bearing by which the surface of the outer periphery and the surface of the bearing track slide on each other may be employed.

A desired number of rotating magnetic field generating sources for driving the rotor are provided within the tubular flow passage, on the inner wall surface, in the wall constituting the tubular flow passage or on the outer surface of said wall.

The magnetic field generating source is covered so as to have the required resistances such as corrosion resistance, heat resistance, erosion resistance, wear resistance, etc. It may be fixed within the tubular flow passage or on the inner wall surface or may be embedded into the wall; further, the source may be provided externally of or within the wall of the tubular flow passage with a magnetic field generating capacity enough to impart the required turning force to the rotor.

The provision of the rotational magnetic field producing means externally of the wall of the flow passage or into the wall is preferable in that there is no need of taking the corrosion, erosion, or wear of said means caused by the fluid into consideration. The former is preferable as being simple in construction.

Where the magnetic field generating means is embedded into the wall of the tubular flow passage or provided externally of the wall of the tubular flow passage, a cooling function element may be attached thereto as needed.

Partitioning wall material used to form a pipeline or a tubular flow passage is suitably selected among normally used metal materials, non-metal materials, that is, high polymer material, ceramics material and the like.

Where the rotating magnetic field generating device is provided externally of the tubular passage partitioning wall or in the same, that is, where the tubular flow passage wall is interposed between the magnetic field generating source for actuating the valve and the rotor, material for the partitioning wall to form a tubular flow passage is desirably a material having a magnetic permeability as large as possible.

The position of the magnetic field generating source is determined according to the direction of the rotation axis of the rotor positioned in the tubular flow passage.

One or more valve bodies are coupled through sliding screws, ball screws or the like to the rotor itself, the rotational shaft of the same, the rotational shaft of the motor or the rotational shaft mechanically coupled to the rotational shaft of the rotor.

The valve body is rectilinearly displaced by the rotation of the rotor itself or the rotational shaft of the rotor or the like through the sliding screw or ball screw, or actuated by the forward and backward moving shaft of a transmission mechanism connected to the rotor.

In the case where the torque of the rotor or motor is small, or where the displacement of the valve body with respect to the degree of rotation of the rotor or motor is reduced to enhance the ability for fine adjustment of flow rate, the transmission mechanism with various gears and other turning force transmission mechanical elements is coupled to the rotational shaft of the rotor or motor so that the rotational shaft or the forward and backward moving shaft for driving the valve body may be actuated. On the other hand, the motor assembly in the present invention may be constituted by a step motor.

The valve of the present invention may be any of normal globe valve, needle valve, sluice valve, cage valve, etc.

One or more valve seats which engage with the valve body or allow the valve body to fit in to constitute a valve are provided in the tubular flow passage.

The valve seat is provided in the tubular flow passage of the fluid or at the end of the tubular flowpassage according to the feature of the action of the valve body.

According to the present invention, the valve body may be disposed in such a manner that, to open the valve, the valve body is disengaged from the valve seat located at one end or both ends of the tubular flowpassage of the valve and shifted outwardly of the tubular flow passage of the valve.

The axis common to a valve and its valve seat may not be on a same straight line which is the axis of rotation shaft of the motor or the like, and the plane of the valve seat opening may not be perpendicular to the flow direction of the fluid through the tubular passage of the valve of the present invention, because the valve body can be moved forward or backward by transmitting the rotation of the rotating shaft of the rotor or motor, through a universal joint, flexible shaft, or transmission mechanism utilized between the rotating shaft and the valve body, to a valve body side end rotating rod with external thread which engage with bore of the valve body having sliding screw or ball screw of internal thread or with worm wheel connected to the valve body.

In order to adapt the flow characteristics (degree of valve opening vs. flow rate) of the valve related to the size, shape or others of the valve body and the valve seat to the desired flow regulation characteristics of a flow passage system in which the valve is used, the number of poles of the magnetic field generating source, and mechanical and geometrical structural shape of the same may be varied. The position and magnitude of voltage and current applied to each of the magnetic field producing sources may be varied corresponding to the waveform and frequency of voltage and current applied and to the geometrical position of each magnetic field generating source whereby the rotational speed and turning force of the rotor or the like may be varied.

To control the operating condition of the valve body as required, the voltage and current applied to the magnetic field generating source may be any of the pulse voltage and current, AC and DC.

The rotor means rotated by the rotating magnetic field generated by the rotating magnetic field generating means may be of a magnetic material represented by pieces of iron or magnets, or a conductive material such as metal which internally generates an eddy current by means of an external magnetic field. The type which encases a conductive member such as a metal member constituting a coil to which voltage and current are not applied may be employed.

For detection of the rotational speed and the number of rotations of the rotor to detect the position of the valve body, a pick-up coil, a photo-electric switch, Hall element, Hall integrated circuit, magnetic reluctance element, Wiegant effective element, or magnetic transistor may be used. To detect the position itself of the valve body including the case when the valve is totally opened and totally closed, differential transformer, resolver, encoder, limit switch, reed switch, piezo-electric switch, photo-electric switch, torque switch or the like may be used.

The rotor or motor of the valve according to the present invention may be secured to the desired position in the tubular flowpassage for operation, and the distance from the valve body and the valve seat is selected as required. A flexible rotational shaft and its bearing means may be used to transmit a turning force of the rotational shaft of the rotor or the like to allow the presence of a bend of a flowpassage as far as the valve body and the valve seat.

Where plural sets of valve bodies and valve seats are provided in one valve of this invention, a branch discharging opening may be provided in a flowpassage between each set of valve body and valve seat so that a multi-direction (more than three directions) valve may be formed.

To allow the valve of this invention to possess the check valve function, a valve body and a valve seat for the check valve may be provided at a suitable position in the valve.

While normally the tubular flowpassage in the present invention for the fluid has a circular cross section, it is to be noted in the valve of this invention that as needed, the tubular flowpassage for the fluid may not be circular, but may be oval, triangle, square, or in other polygon form in cross section, particularly when the rotating magnetic field generating means is disposed in the space within the tubular flowpassage.

A hollow annular body encasing a fluid therein may be provided on the valve seat and fluid pressure within the annulr body being detected and controlled to make smooth the access and contact of the valve body to the valve seat when the valve is closed to enhance the sealing properties after the contact.

A labyrinth function portion may be provided on either or both of the valve body and valve seat for the purpose of enhancing the tightness of the seal, etc.

DESCRIPTION OF PREFERRED EMBODIMENTS

FIGS. 1 to 6 respectively show schematic longitudinal sectional views of embodiments of valve valve according to the present invention.

FIG. 1 shows a first embodiment in which this invention is applied to a needle valve.

A group of coils 2 for generating a rotating magnetic field are disposed so as to surround a portion of the outside of a valve housing 1 of having a tubular flow passage of circular cross section.

A rotor 4 is supported and positioned by means of two fixing elements 3 within the tubular flowpassage and it is rotated according to the direction, voltage, frequency and waveform of current supplied to the group of coils 2, for adjustment of the opening degree of the needle valve. The external thread portion 6 positioned on one end of a shaft 5 of the rotor 4 provides first screw means which is engaged with the internal thread portion 8 of a valve body 7 to constitute a sliding second screw thread means of the valve.

On rotation of the rotor 4 the sliding screw thread portion 8 functions together with a guide plate 9 which is secured to the housing 1 in order to allow the valve body 7 to move linearly while preventing rotation of the valve body 7, to make the valve body 7 engage or disengage from a valve seat 10.

Figure 2:
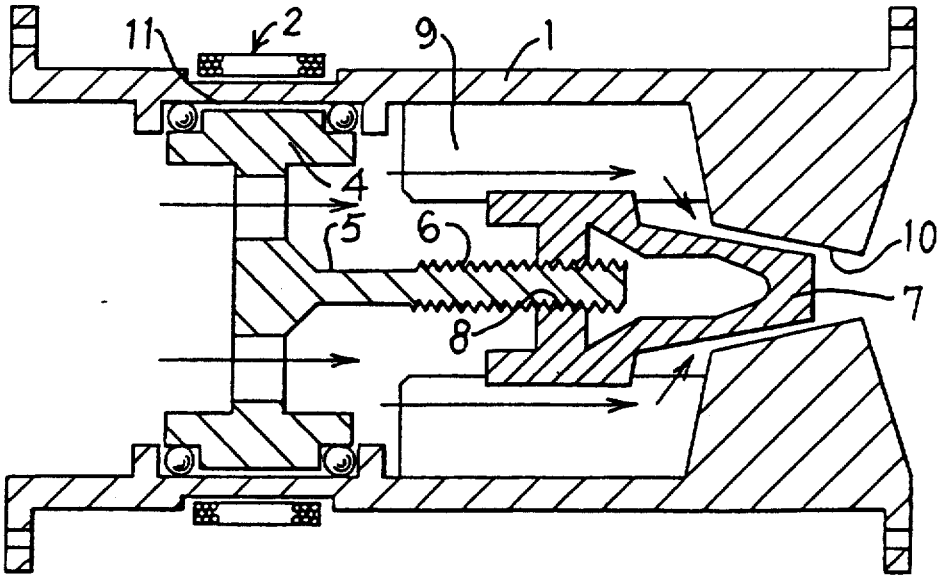
Figure 3:
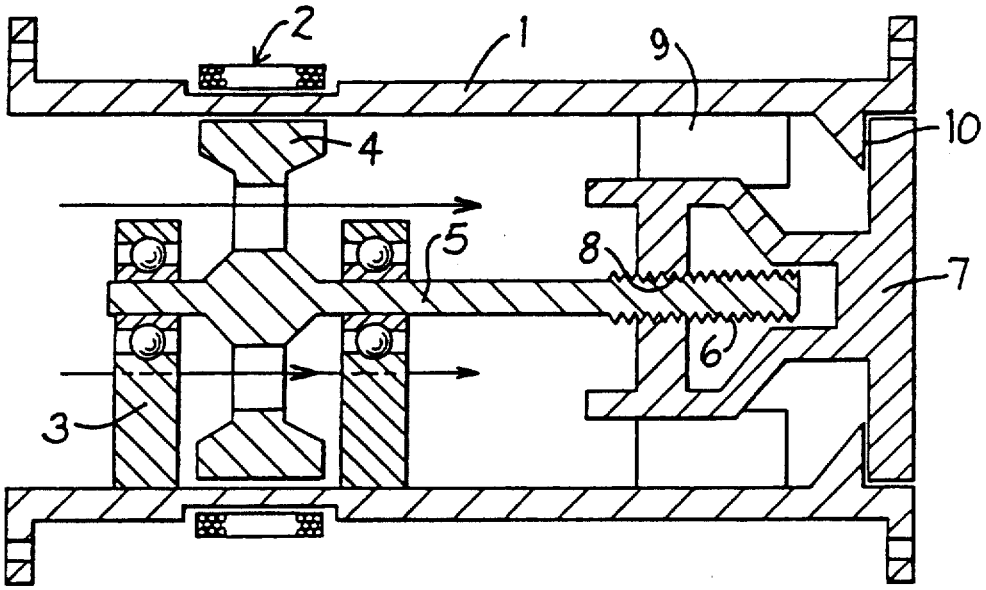
Figure 4:
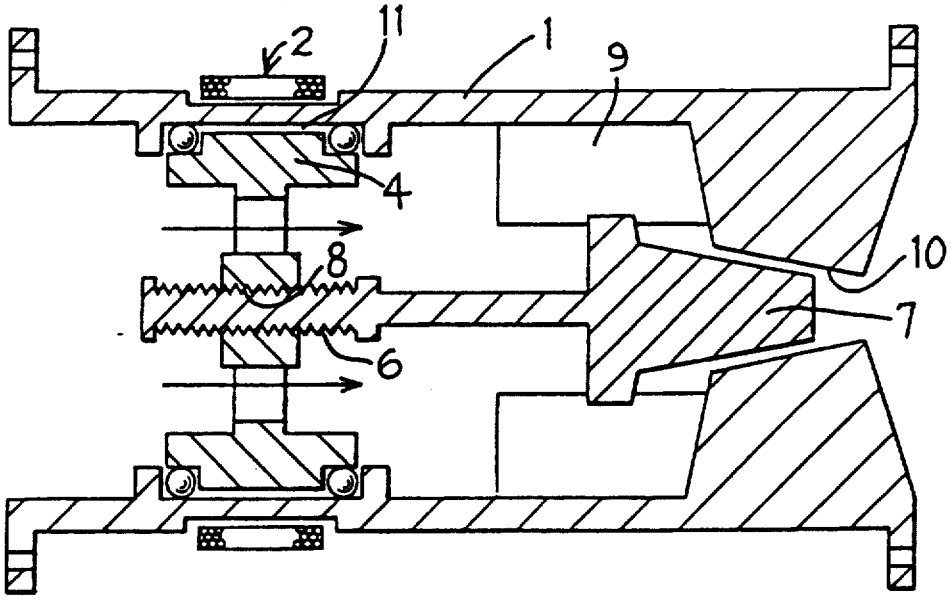

FIG. 2 shows a second example of a needle valve which is operated when the rotor 4 is rotated with rotor being supported by bearing balls which roll on a bearing track portion 11 of the inner surface of the housing 1, without being supported by the fixing elements 3. FIG. 3 shows a valve of the type in which the valve is mounted on a dam wall or the like and is suitable for use as a water discharging valve, wherein a valve seat 10 is located at the end of a tubular flowpassage, and when the valve is open, the valve body 7 extends outwardly of the tubular flowpassage of the valve. FIG. 4 shows a third example of a needle valve in which an internally threaded rotor 4 is threadedly engaged with an actuating or propelling shaft of a valve body 7 which shaft is externally threaded.

Figure 5:
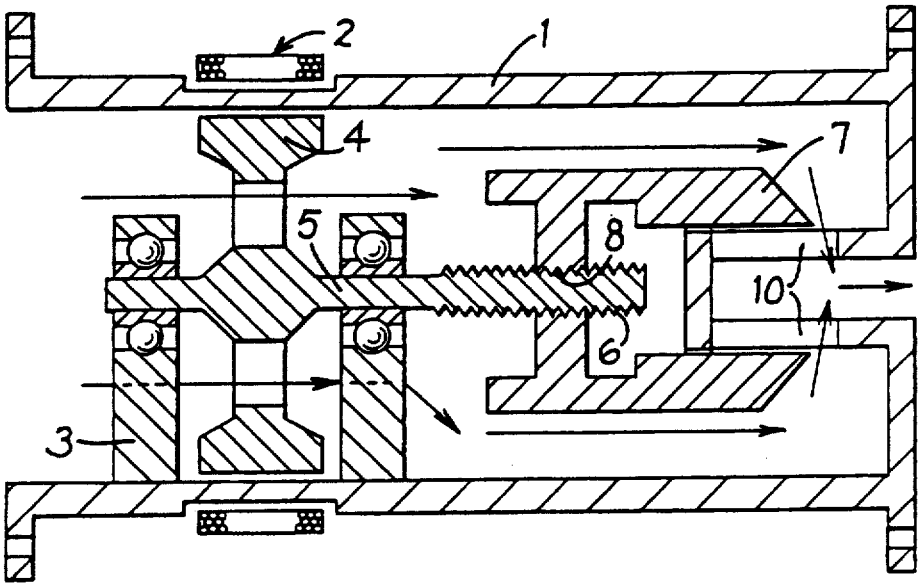

FIG. 5 shows an example of a sluice valve comprising two valve seats 10, and a valve body 7 having two function portions. Also in the FIGS. 4 and 5 examples, the rotation of the valve body 7 is prevented by suitable means similarly to FIG. 1 and the like.

Figure 6:
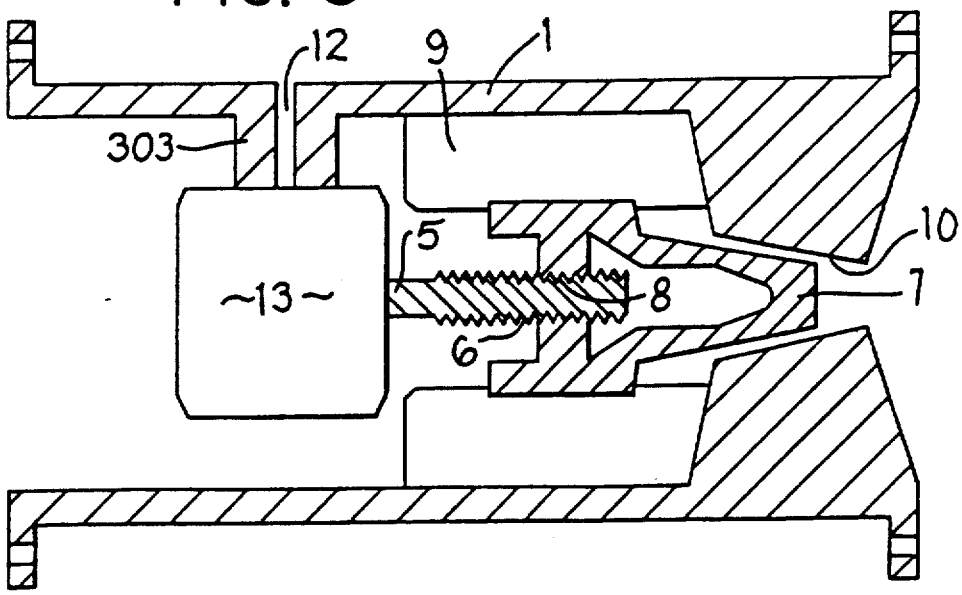
Figure 7:
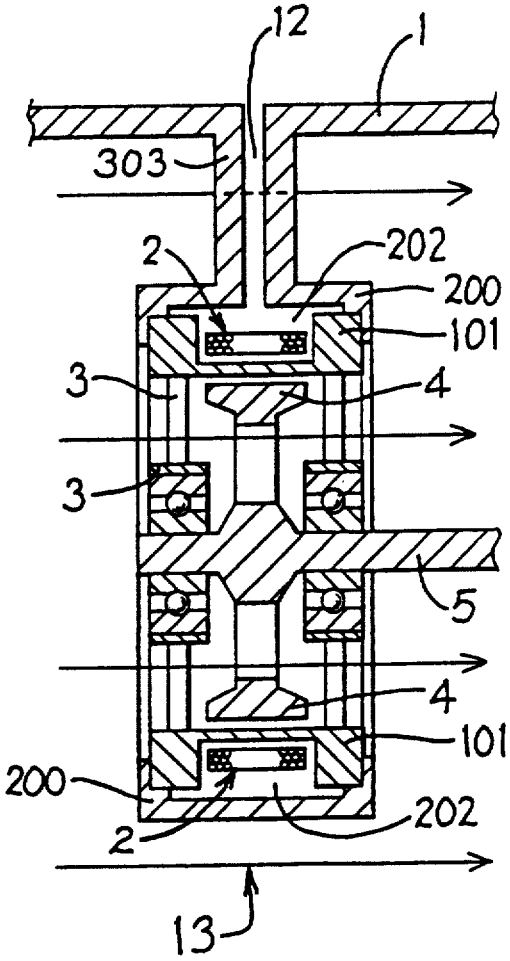
FIG. 7 is a schematic view for explaining one example of an electric motor 13 shown in FIG. 6. In these figures, the arrows indicated by the bold lines show the flow direction of the fluid.

FIGS. 6 and 7 show a fourth example of a needle valve of the type in which a set of a group of coils 2 and a rotor 4 is provided as one unit of an electric motor 13 within a tubular flowpassage. A passage 12 bored through a fixing element 303 of the motor may be used both for electric wiring and for introducing and discharging a cooling medium for the motor.

This motor 13 may house therein the construction illustrated with FIG. 1, for example, as will be understood from FIG. 7, thereby eliminating the provision of a sliding sealing portion.

An annular space 202 which houses therein a group of coils 2 for producing a rotating magnetic field is communicated with the exterior of a wall 1 through a passage 12 while a space within a cylindrical casing 101 is communicated with a flowpassage inside the wall 1 but not communicated with the exterior of the wall 1.

A stator 200 makes the space 202 to be closed against the fluid.

The example illustrated in FIG. 6 is an example in which a rotating magnetic field generating source is disposed in a space within the tubular flowpassage.

What is claimed is:

1. A valve comprising:

a valve housing having an interior surface defining an elongated tubular flowpassage and a valve seat in said flowpassage;

rotor means disposed in said flowpassage, bearing track means provided on said interior surface of said valve housing, said bearing track means supporting said rotor means for rotation in said flow passage and fixing said rotor means against lengthwise movement in said flowpassage; magnetic field generating means fixedly positioned around said rotor means and capable of generating a rotating magnetic field for rotating said rotor means; first screw means coaxial with and connected to said rotor means so that said rotor means and said first screw means rotate together; valve body means movable longitudinally in said flowpassage for selectively sealingly engaging said valve seat, said valve body means being held against rotation in said flowpassage, and second screw means connected to said valve body means and threadedly engaging said first screw means whereby rotation of said rotor is effective to move said valve body means linearly toward or away from said valve seat to adjust the degree of opening or closing of the valve.

2. A valve according to claim 1, wherein said rotor means has a coaxial shaft and said first screw means is an external thread on said shaft, and said second screw means is an internal thread on said valve body means.

3. A valve according to claim 1, wherein said magnetic field generating means is provided on the outer surface of said valve housing.

4. A valve according to claim 1, wherein said first screw means are internal threads on said rotor means and said second screw means are external threads on a shaft connected to said valve body means.

*5. A valve comprising:*

*a valve housing having an interior surface defining an elongated tubular flowpassage and a valve seat in said flow passage defining aperture means in fluid flow communication with said flowpassage;*

*rotor means disposed in said flowpassage, bearing track means provided on said interior surface of said valve housing, said bearing track means supporting said rotor means for rotation in said flowpassage and fixing said rotor means against lengthwise movement in said flowpassage; magnetic field generating means fixedly positioned around said rotor means and capable of generating a rotating magnetic field for rotating said rotor means; first threaded means coaxial with and connected to said rotor means so that said rotor means and said first threaded means rotate together; valve body means movable longitudinally in said flowpassage for selectively adjusting the degree of opening and closing of said aperture means, said valve body means being held against rotation in said flowpassage; and second threaded means connected to said valve body means and drivingly coupled to said first threaded means whereby rotation of said rotor means is effective to move said valve body means linearly to adjust the degree of opening or closing of the valve.*

*6. A valve according to claim 5, wherein said rotor means has a coaxial shaft and said first threaded means is an external thread on said shaft, and said second threaded means is an internal thread on said valve body means.*

*7. A valve according to claim 5, wherein said first threaded means comprise an internal thread on said rotor means and said second threaded means comprise an external thread on a shaft connected to said valve body means.*

*8. A magnetically actuated valve comprising:*

*a valve housing having an interior surface defining an elongated flowpassage and having valve seat means defining aperture means in fluid flow communication with said flow passage;*

*valve body means linearly movable within said flow passage for selectively opening and closing said aperture means and adjusting the degree of opening or closing of said aperture means;*

*a magnetically operable rotor in said flowpassage;*

*bearing track means on said interior surface of said valve housing and supporting said rotor for rotation and holding said rotor against lengthwise movement in said valve housing;*

*magnetic field generating means located around said rotor for inducing rotation of said rotor; and*

*a screw and nut arrangement disposed in said flow passage for converting rotational motion of said rotor into linear movement of said valve body means.*

*9. A valve according to claim 8, wherein said rotor has a coaxial shaft having external thread means thereon defining said screw of said screw and nut arrangement, said valve body means having internal thread means defining said nut of said screw and nut arrangement.*

*10. A valve according to claim 8, wherein said magnetic field generating means is located outside said valve housing.*

*11. A valve according to claim 8, wherein said rotor has internal thread means defining said nut of said screw and nut arrangement, said valve body means having a coaxial shaft having external thread means thereon defining said screw of said screw and nut arrangement.*

* * * * *